United States Patent
Hung et al.

(10) Patent No.: US 11,876,175 B2
(45) Date of Patent: Jan. 16, 2024

(54) SECONDARY BATTERY STRUCTURE HAVING WINDABLE FLEXIBLE POLYMER MATRIX SOLID ELECTROLYTE AND MANUFACTURING METHOD THEREOF

(71) Applicant: KANG NA HSIUNG ENTERPRISE CO., LTD., Tainan (TW)

(72) Inventors: Fei-Yi Hung, Tainan (TW); Jung-Chi Tai, Tainan (TW)

(73) Assignee: Kang Na Hsiung Enterprise Co., Ltd., Tainan (TW)

( * ) Notice: Subject to any disclaimer, the term of this patent is extended or adjusted under 35 U.S.C. 154(b) by 954 days.

(21) Appl. No.: 16/842,104

(22) Filed: Apr. 7, 2020

(65) Prior Publication Data

US 2020/0328472 A1 Oct. 15, 2020

Related U.S. Application Data

(60) Provisional application No. 62/833,093, filed on Apr. 12, 2019.

(51) Int. Cl.
| | |
|---|---|
| *H01M 10/0565* | (2010.01) |
| *H01M 4/134* | (2010.01) |
| *H01M 4/66* | (2006.01) |
| *H01M 4/80* | (2006.01) |
| *H01M 10/0525* | (2010.01) |
| *H01M 10/0562* | (2010.01) |
| *H01M 50/414* | (2021.01) |
| *H01M 50/417* | (2021.01) |
| *H01M 50/423* | (2021.01) |
| *H01M 4/02* | (2006.01) |

(52) U.S. Cl.
CPC ....... *H01M 10/0565* (2013.01); *H01M 4/134* (2013.01); *H01M 4/663* (2013.01); *H01M 4/667* (2013.01); *H01M 4/806* (2013.01); *H01M 10/0525* (2013.01); *H01M 10/0562* (2013.01); *H01M 50/414* (2021.01); *H01M 50/417* (2021.01); *H01M 50/423* (2021.01); *H01M 2004/027* (2013.01); *H01M 2004/028* (2013.01)

(58) Field of Classification Search
CPC . H01M 50/414; H01M 50/417; H01M 50/423
See application file for complete search history.

(56) References Cited

U.S. PATENT DOCUMENTS

2019/0115580 A1* 4/2019 Kim ................... H01M 50/417

FOREIGN PATENT DOCUMENTS

| | | |
|---|---|---|
| CN | 109786817 A | 5/2019 |
| CN | 110085904 A | 8/2019 |
| TW | I617067 B | 3/2018 |

* cited by examiner

*Primary Examiner* — Stephan J Essex
(74) *Attorney, Agent, or Firm* — Rosenberg, Klein & Lee

(57) ABSTRACT

The present invention relates to a secondary battery structure having a windable flexible polymer matrix solid electrolyte and a manufacturing method thereof. The manufacturing method comprises the steps of electroplating a positive electrode on a first side of a cloth solid electrolyte; then electroplating a negative electrode on a second side opposite to the first side of the cloth solid electrolyte; and conducting a heat treatment process to form a first carbonized layer between the positive electrode and the cloth solid electrolyte, and a second carbonized layer between the negative electrode and the cloth solid electrolyte.

6 Claims, 1 Drawing Sheet

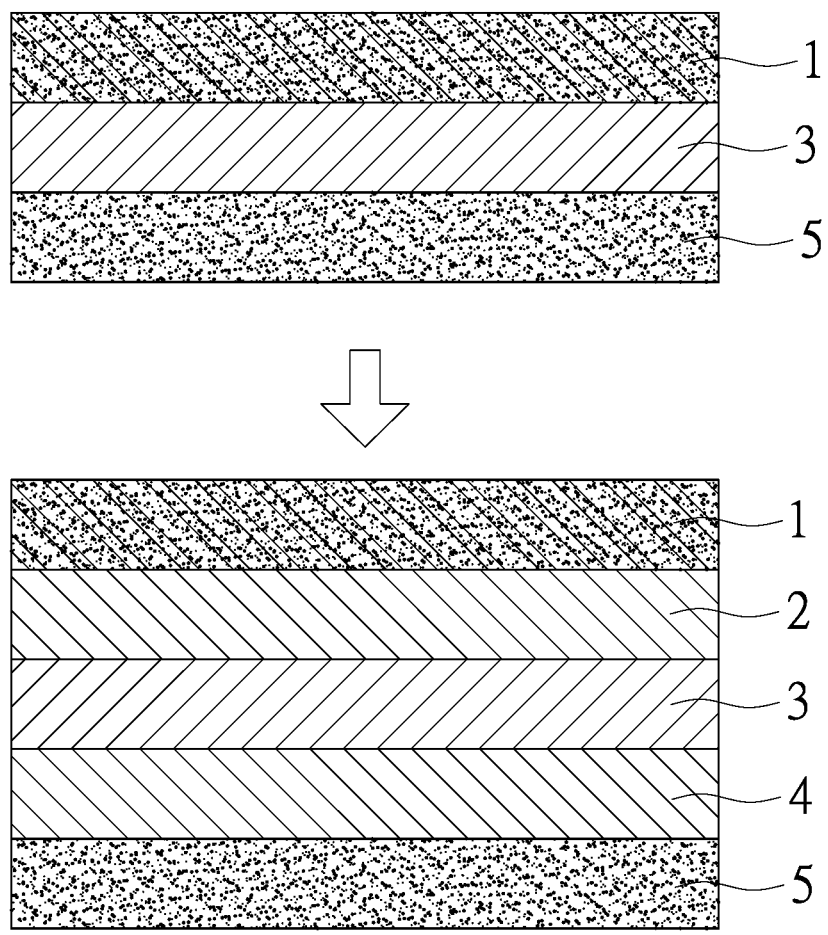

SECONDARY BATTERY STRUCTURE HAVING WINDABLE FLEXIBLE POLYMER MATRIX SOLID ELECTROLYTE AND MANUFACTURING METHOD THEREOF

BACKGROUND OF THE INVENTION

1. Field of the Invention

The present invention relates to a secondary battery structure and a manufacturing method thereof, especially for the secondary battery structure having a windable flexible polymer matrix solid electrolyte and the manufacturing method of preparing the same.

2. Description of Related Art

A secondary battery is also known as storage battery or rechargeable battery. Most of the secondary batteries used around the world today are lithium batteries containing liquid electrolyte. However, the use of liquid electrolyte-containing lithium batteries may have the disadvantages of leakage, hazards to human health and the environment, and explosion. Therefore, in recent years, solid-state batteries with solid electrolytes have been developed to replace batteries containing liquid electrolytes.

For instance, the Taiwan patent No. TWI617067B, issued on 1 Mar. 2018, has disclosed a magnesium-rich solid salt conductive ion material and a manufacturing method thereof. The manufacturing method comprises the steps of preparing metal magnesium (e.g. pure magnesium, a magnesium oxide or a magnesium alloy); and mixing the metal magnesium with an acid solution for reaction at a temperature of 25° C. to 65° C. for 1 to 12 hours so as to form a magnesium-rich solid salt conductive ion material. The magnesium-rich solid salt conductive ion material can be formed into an all solid state secondary battery after being pasted with a positive electrode and a negative electrode to form positive electrode/magnesium-rich solid salt conductive ion material/negative electrode, and thus can replace a liquid electrolyte for preventing electrolyte leakage and effectively improving battery performance and life.

However, most batteries having solid electrolyte are still in initial stage and cannot be wound. To solve this problem, flexible and bendable batteries were developed. For instance, the China patent No. CN110085904A, published on 2 Aug. 2019, has disclosed a flexible composite solid-state electrolyte, a full-solid-state lithium-ion battery and a preparation method thereof. The flexible composite solid-state electrolyte is mainly prepared by mixing a sulfide solid-state electrolyte or a modifier thereof (low toxic), a thermoplastic polymer or a modifier thereof and lithium salt. The flexible full-solid-state lithium-ion battery comprising the flexible composite solid-state electrolyte has good mechanical performance and bending performance, and high cycle life and energy density.

The China patent No. CN109786817A, published on 21 May 2019, has disclosed a solid-state lithium battery, an application thereof and a method for preparing a solid-state electrolyte membrane reinforced by non-woven fabric. The solid-state lithium battery comprises a solid-state electrolyte membrane reinforced by non-woven fabric, a positive electrode, a negative electrode and a buffer layer. The solid-state electrolyte membrane further comprises a first solid sulfide electrolyte (low toxic), a non-woven fabric, and a first binder. Therefore, the solid-state electrolyte membrane reinforced by non-woven fabric can prevent short circuit between the positive and negative electrodes during the assembly and use of the solid-state battery, has a very high success rate in mass production, and has relatively high mechanical strength.

Due to the large demand for secondary batteries in the market, it is still necessary to continue to develop various secondary batteries with solid electrolytes and improved capacity and charge/discharge efficiency.

SUMMARY OF THE INVENTION

In view of the above-mentioned problems, the object of the present invention is to provide a secondary battery structure having a windable flexible polymer matrix solid electrolyte and a manufacturing method thereof by using non-woven technology. The secondary battery comprising a cloth solid electrolyte can be bent and rolled for use.

Disclosed herein is a method for manufacturing a secondary battery structure having a windable flexible polymer matrix solid electrolyte. It comprises the steps of (a) electroplating a positive electrode on a first side of a cloth solid electrolyte; (b) electroplating a negative electrode on a second side opposite to the first side of the cloth solid electrolyte; and (c) conducting a heat treatment process to form a first carbonized layer between the positive electrode and the cloth solid electrolyte and a second carbonized layer between the negative electrode and the cloth solid electrolyte. Preferably, the heat treatment process is an infrared treatment or a microwave treatment and conducted in an environment with a temperature of 80° C. to 150° C. for 30 to 300 seconds.

A secondary battery structure having a windable flexible polymer matrix solid electrolyte is also disclosed herein. It comprises a cloth solid electrolyte; a positive electrode disposed on a first side of the cloth solid electrolyte; a negative electrode disposed on a second side of the cloth solid electrolyte; a first carbonized layer disposed between the positive electrode and the cloth solid electrolyte; and a second carbonized layer disposed between the negative electrode and the cloth solid electrolyte.

According to an embodiment of the present invention, the positive electrode is made of magnesium-based metal, lithium-based metal, sodium-based metal, gallium-based metal, tin-based metal or alloy metal foil thereof, and the negative electrode is made of a carbon film, a metal film, or an alloy film.

According to an embodiment of the present invention, the cloth solid electrolyte is a non-woven fabric or cotton cloth, and the non-woven fabric is preferably made of polypropylene (PP), polyethylene (PE), polyethylene terephthalate (PET) or nylon.

According to an embodiment of the present invention, both of the first carbonized layer and the second carbonized layer are metal carbides. For instance, the metal carbide is selected from the group consisting of magnesium carbide (MgC), lithium carbide (LiC), sodium carbide (NaC), gallium carbide (GaC) and tin carbide (SnC).

Accordingly, the solid electrolyte of the present invention made by non-woven technology is non-toxic, and allows the secondary battery of the present invention to be bent and wound. Furthermore, the present invention prevents problems of leakage and explosion due to the liquid electrolyte used in the conventional secondary battery and achieves effects of high temperature resistance and rapid charge and discharge.

BRIEF DESCRIPTION OF THE DRAWINGS

The FIGURE is a flow diagram showing a heat treatment process of a secondary battery structure according to the present invention.

DETAILED DESCRIPTION OF THE PREFERRED EMBODIMENT

Hereinafter, an exemplary embodiment of the present invention will be described in detail with reference to the accompanying drawings.

A method for manufacturing a secondary battery structure having a windable flexible polymer matrix solid electrolyte is disclosed herein. The method comprises the steps of:
(a) electroplating a positive electrode on a first side of a cloth solid electrolyte;
(b) electroplating a negative electrode on a second side opposite to the first side of the cloth solid electrolyte; and
(c) conducting a heat treatment process to form a first carbonized layer between the positive electrode and the cloth solid electrolyte and a second carbonized layer between the negative electrode and the cloth solid electrolyte. Preferably, the heat treatment process is an infrared treatment or a microwave treatment and conducted in an environment with a temperature of 80° C. to 150° C. for 30 to 300 seconds.

Additionally, a secondary battery structure having a windable flexible polymer matrix solid electrolyte is also disclosed herein. It comprises a cloth solid electrolyte; a positive electrode disposed on a first side of the cloth solid electrolyte; a negative electrode disposed on a second side of the cloth solid electrolyte, a first carbonized layer disposed between the positive electrode and the cloth solid electrolyte; and a second carbonized layer disposed between the negative electrode and the cloth solid electrolyte.

Preferably, the positive electrode is made of magnesium-based metal, lithium-based metal, sodium-based metal, gallium-based metal, tin-based metal or alloy metal foil thereof; and the negative electrode is made of a carbon film, a metal film, or an alloy film.

Preferably, the cloth solid electrolyte is a non-woven fabric or cotton cloth, and the non-woven fabric is made of polypropylene (PP), polyethylene (PE), polyethylene terephthalate (PET) or nylon.

Preferably, both of the first carbonized layer and the second carbonized layer are metal carbides. For instance, the metal carbide is selected from the group consisting of magnesium carbide (MgC), lithium carbide (LiC), sodium carbide (NaC), gallium carbide (GaC) and tin carbide (SnC).

In addition, through the following specific examples, the scope of the present invention can be further proved, but it is not intended to limit the scope of the present invention in any form.

Example 1: Manufacturing a Secondary Battery Structure Having a Windable Flexible Polymer Matrix Solid Electrolyte Referring to the FIGURE, a flow diagram showing a heat treatment process of a secondary battery structure according to the present invention is disclosed. That is, a method for preparing a secondary battery with two layers of cloth solid electrolyte, which has charge and discharge characteristics. The method comprises the steps of (a) electroplating a positive electrode (1) (e.g. made of magnesium-based metal, lithium-based metal, sodium-based metal, gallium-based metal, tin-based metal or alloy metal foil thereof) on a first side of a cloth solid electrolyte (3) (e.g. a non-woven fabric or cotton cloth); (b) electroplating a negative electrode (5) (e.g. a carbon film, a metal film, or an alloy film) on a second side opposite to the first side of the cloth solid electrolyte (3); and (c) conducting a heat treatment process to form a first carbonized layer (2) between the positive electrode (1) and the cloth solid electrolyte (3) and a second carbonized layer (4) between the negative electrode (5) and the cloth solid electrolyte (3). The order of steps (a) and (b) can be reversed. The non-woven fabric is made of polypropylene (PP), polyethylene (PE), polyethylene terephthalate (PET) or nylon. Preferably, the heat treatment process is an infrared treatment or a microwave treatment and conducted in an environment with a temperature of 80° C. to 150° C. for 30 to 300 seconds.

Both of the first carbonized layer (2) and the second carbonized layer (4) are metal carbides, and the metal carbide is selected from the group consisting of magnesium carbide (MgC), lithium carbide (LiC), sodium carbide (NaC), gallium carbide (GaC), tin carbide (SnC) and the like so as to make the secondary batteries have high temperature resistance.

Accordingly, the secondary battery structure having a windable flexible polymer matrix solid electrolyte of the present invention is formed. It comprising a cloth solid electrolyte (3); a positive electrode (1) disposed on a first side of the cloth solid electrolyte (3); a negative electrode (5) disposed on a second side of the cloth solid electrolyte (3); a first carbonized layer (2) disposed between the positive electrode (1) and the cloth solid electrolyte (3); and a second carbonized layer (4) disposed between the negative electrode (5) and the cloth solid electrolyte (3). The positive electrode (1) is made of magnesium-based metal, lithium-based metal, sodium-based metal, gallium-based metal, tin-based metal or alloy metal foil thereof and formed by sputtering, spraying, evaporation, painting or the like. The negative electrode (5) is made of a carbon film, a metal film, or an alloy film and formed by sputtering, spraying, evaporation, painting or the like. The cloth solid electrolyte (3) is a non-woven fabric or cotton cloth, and the non-woven fabric is made of polypropylene (PP), polyethylene (PE), polyethylene terephthalate (PET) or nylon, so it can be bent, rolled or stacked.

Example 2: Performance Testing

Different solid state batteries with positive electrode/cloth solid electrolyte (abbreviated with the symbol "B")/carbon electrode are manufactured. The test results of the average charge and discharge capacity (mAh/g) (charging: 12V-1 h, charging and discharging times: 100) of the different solid-state batteries at various temperature conditions are shown in Table 1.

TABLE 1

| mAh/g | Li/B/C | Mg/B/C | Na/B/C |
|---|---|---|---|
| −15° C. | 961 | 885 | 1024 |
| Room temperature | 822 | 638 | 861 |
| 55° C. | 348 | 549 | 783 |
| 85° C. | 262 | 312 | 400 |

Different solid state batteries with magnesium positive electrode/cloth solid electrolyte (abbreviated with the symbol "B")/negative electrode are manufactured. The test results of the average charge and discharge capacity (mAh/g) (charging: 12V-1 h, charging and discharging times: 100) of the different solid-state batteries at various temperature conditions are shown in Table 2.

TABLE 2

| mAh/g | Mg/B/C | Mg/B/Ga | Mg/B/Sn |
|---|---|---|---|
| −15° C. | 885 | 1110 | 1008 |
| Room temperature | 638 | 1186 | 876 |
| 55° C. | 549 | 878 | 772 |
| 85° C. | 312 | 710 | 609 |

Compared with the technique available now, the present invention has the following advantages:

1. The present invention uses a macromolecular-based solid electrolyte instead of the liquid electrolyte, so it can avoid the hazards to human health and the environment due to leakage.

2. The present invention adopts environmental protection and safety materials. Moreover, magnesium is an alkaline earth metal, and its valence number is 2. Compared with lithium with a valence number of 1, magnesium can provide nearly twice the amount of electricity. In addition, magnesium does not generate dendrites, which can prevent explosion.

3. The secondary battery of the present invention can achieve effects of high temperature resistance, high capacity and rapid charge and discharge.

4. The present invention uses the cloth solid electrolyte, so the finished product of the secondary battery can be bent and wound.

What is claimed is:

1. A method for manufacturing a secondary battery structure having a windable flexible polymer matrix solid electrolyte, comprising the steps of:
   (a) electroplating a positive electrode on a first side of a cloth solid electrolyte;
   (b) electroplating a negative electrode on a second side opposite to the first side of the cloth solid electrolyte; and
   (c) conducting a heat treatment process to form a first carbonized layer between the positive electrode and the cloth solid electrolyte and a second carbonized layer between the negative electrode and the cloth solid electrolyte.

2. The method for manufacturing a secondary battery structure having a windable flexible polymer matrix solid electrolyte as claimed in claim 1, wherein the positive electrode is made of magnesium-based metal, lithium-based metal, sodium-based metal, gallium-based metal, tin-based metal or alloy metal foil thereof.

3. The method for manufacturing a secondary battery structure having a windable flexible polymer matrix solid electrolyte as claimed in claim 1, wherein the negative electrode is made of a carbon film, a metal film, or an alloy film.

4. The method for manufacturing a secondary battery structure having a windable flexible polymer matrix solid electrolyte as claimed in claim 1, wherein the cloth solid electrolyte is a non-woven fabric or cotton cloth, and the non-woven fabric is made of polypropylene (PP), polyethylene (PE), polyethylene terephthalate (PET) or nylon.

5. The method for manufacturing a secondary battery structure having a windable flexible polymer matrix solid electrolyte as claimed in claim 1, wherein the heat treatment process is an infrared treatment or a microwave treatment and conducted in an environment with a temperature of 80° C. to 150° C. for 30 to 300 seconds.

6. The method for manufacturing a secondary battery structure having a windable flexible polymer matrix solid electrolyte as claimed in claim 1, wherein both of the first carbonized layer and the second carbonized layer are metal carbides.

* * * * *